(12) United States Patent
He

(10) Patent No.: US 12,021,235 B2
(45) Date of Patent: Jun. 25, 2024

(54) ARTIFICIAL GRAPHITE, SECONDARY BATTERY, METHOD FOR THE PREPARATION THEREOF, AND APPARATUS

(71) Applicant: Contemporary Amperex Technology Co., Limited, Ningde (CN)

(72) Inventor: Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 477 days.

(21) Appl. No.: 17/463,525

(22) Filed: Aug. 31, 2021

(65) Prior Publication Data

US 2021/0399301 A1 Dec. 23, 2021

Related U.S. Application Data

(63) Continuation of application No. PCT/CN2019/122650, filed on Dec. 3, 2019.

(51) Int. Cl.
| | |
|---|---|
| H01M 4/587 | (2010.01) |
| C01B 32/20 | (2017.01) |
| C01B 32/205 | (2017.01) |
| H01M 4/133 | (2010.01) |
| H01M 10/0525 | (2010.01) |
| H01M 4/02 | (2006.01) |

(52) U.S. Cl.
CPC ............. *H01M 4/587* (2013.01); *C01B 32/20* (2017.08); *C01B 32/205* (2017.08); *H01M 4/133* (2013.01); *C01P 2004/51* (2013.01); *C01P 2004/61* (2013.01); *C01P 2006/11* (2013.01); *H01M 2004/027* (2013.01); *H01M 10/0525* (2013.01)

(58) Field of Classification Search
None
See application file for complete search history.

(56) References Cited

U.S. PATENT DOCUMENTS

| | | |
|---|---|---|
| 2014/0127488 A1 | 5/2014 | Zhamu et al. |
| 2015/0251911 A1 | 9/2015 | Yamamoto et al. |

FOREIGN PATENT DOCUMENTS

| | | |
|---|---|---|
| CN | 1851963 A | 10/2006 |
| CN | 102887509 A | 1/2013 |
| CN | 105938906 A | 9/2016 |
| CN | 107369823 A | 11/2017 |
| CN | 108807974 A | 11/2018 |
| CN | 109704323 A | 5/2019 |
| CN | 109704324 A | 5/2019 |
| CN | 110451501 A | 11/2019 |
| EP | 3641034 A1 | 4/2020 |
| JP | 2012151088 A | 8/2012 |
| JP | 2018166107 A | 10/2018 |
| KR | 20190062319 A | 6/2019 |
| WO | 2012077653 A1 | 6/2012 |

OTHER PUBLICATIONS

The Communication pursuant to Article 94(3) EPC for European Application No. 19954920.5, dated Nov. 30, 2022, 5 pages.
The Communication pursuant to Article 94(3) EPC for European Application No. 19954920.5, dated Jul. 5, 2022, 7 pages.
The First Office Action for India Application No. 202217009392, dated Jul. 11, 2022, 5 pages.
The First Office Action for CN Application No. 201980066491.0, dated Sep. 12, 2023, 11 pages.
The International search report for PCT Application No. PCT/CN2019/122650, dated Sep. 7, 2020, 12 pages.
The third party submission for KR Application No. 10-2022-7007002, dated Sep. 21, 2023, 3 pages.
The First Office Action for JP Application No. 2022-513129, dated Feb. 27, 2023, 6 pages.
The extended European search report for EP Application No. 19954920.5, dated Mar. 9, 2022, 8 pages.

*Primary Examiner* — Carlos Barcena
(74) *Attorney, Agent, or Firm* — East IP P.C.

(57) ABSTRACT

The present application discloses an artificial graphite, a secondary battery, a preparation method and an apparatus. The artificial graphite includes secondary particles formed by agglomeration of primary particles, the artificial graphite having a volume average particle size Dv50, denoted as A, the artificial graphite through powder compaction under a pressure of 2000 kg having a volume average particle size Dv50, denoted as B, wherein A and B satisfies: B/A≥0.85. Using the artificial graphite provided by the present application can greatly reduce the cyclic expansion of the secondary battery.

20 Claims, 4 Drawing Sheets

ARTIFICIAL GRAPHITE, SECONDARY BATTERY, METHOD FOR THE PREPARATION THEREOF, AND APPARATUS

CROSS-REFERENCE OF RELEVANT APPLICATION

This application is a continuation of International Application No. PCT/CN2019/122650, filed on Dec. 3, 2019, which is incorporated herein by reference in its entirety.

TECHNICAL FIELD

The present application belongs to the technical field of secondary batteries, and specifically relates to an artificial graphite, a secondary battery, a method for the preparation thereof and an apparatus.

BACKGROUND

Secondary batteries are widely used due to their outstanding features such as high energy density, no pollution, and long service life.

However, the volume of the secondary battery will expand during the cycle, which causes the internal stress of the battery to increase, thus affecting the service life and safety performance of the battery. For example, with the rapid popularity of new energy vehicles, the market has increasingly higher requirements for the service life and safety performance of power-type secondary batteries. In order to enhance the market competitiveness of new energy vehicles, it is indeed necessary to provide a new technology that can reduce the volume expansion of secondary batteries.

SUMMARY

The present application provides an artificial graphite, a secondary battery, a preparation method and an apparatus that can reduce the volume expansion of the secondary battery during cycle.

In order to achieve the above object, the first aspect of the present application provides an artificial graphite, which includes secondary particles formed by agglomeration of primary particles, the artificial graphite having a volume average particle size Dv50, denoted as A, the artificial graphite through powder compaction under a pressure of 2000 kg having a volume average particle size Dv50, denoted as B, wherein A and B satisfies: B/A≥0.85.

A second aspect of the present application provides a secondary battery including a negative electrode plate, wherein the negative electrode plate includes a negative active material, and the negative active material includes the artificial graphite according to the first aspect of the present application.

A third aspect of the present application provides an apparatus including the secondary battery according to the second aspect of the present application.

The fourth aspect of the present application provides a method for preparing an artificial graphite, including the following steps:

(1) crushing green coke materials and classifying them to remove fine powder, so as to obtain a precursor;
(2) shaping the precursor crushed in step (1);
(3) granulating the precursor treated in step (2) during which a binder is added in an amount not exceed 5% of the total weight of the green coke materials;
(4) subjecting the product obtained in step (3) to a graphitization treatment at a temperature of 2800° C. to 3200° C. to obtain the artificial graphite;

wherein the artificial graphite includes secondary particles formed by agglomeration of primary particles, the artificial graphite has a volume average particle size Dv50, denoted as A, the artificial graphite through powder compaction under a pressure of 2000 kg has a volume average particle size Dv50, denoted as B, and a relationship between A and B satisfies: B/A≥0.85.

A fifth aspect of the present application provides a method for preparing a secondary battery, including the step of using the artificial graphite described in the first aspect of the present application to prepare a negative electrode plate.

The artificial graphite provided in the present application includes secondary particles formed by agglomeration of primary particles, and the volume average particle size of the artificial graphite and the volume average particle size of the artificial graphite through powder compaction under a pressure of 2000 kg meets a specific relationship. Therefore, the artificial graphite has higher structural strength, whose bulk structure stability is better, and which can still effectively keep its own low orientation during the process of preparing the negative electrode plate by rolling. When the artificial graphite is used for the electrode plate of the secondary battery, the selectivity of the artificial graphite in a particular direction during the intercalation of lithium is significantly reduced, so that the volume expansion of the secondary battery during cycle is significantly reduced. The secondary battery with a low cyclic expansion has improved cycle life and safety performance. The apparatus of the present application includes the secondary battery provided by the present application, and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1A:
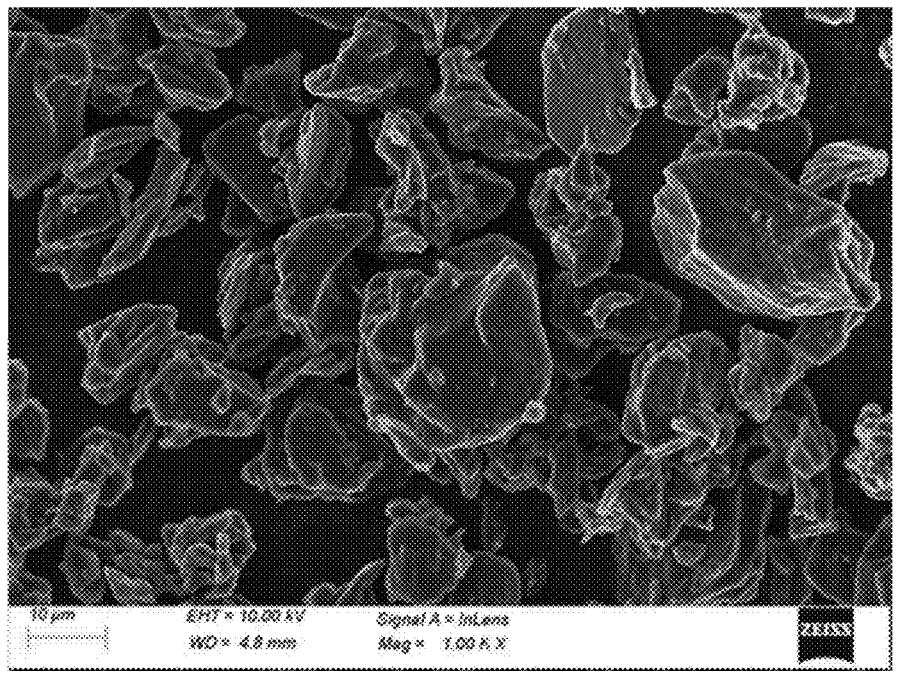
FIGS. 1a-1c are SEM (scanning electron microscope) images of the morphology of artificial graphite particles provided by an embodiment of the present application.

Among them, the reference signs are explained as follows: 1. Battery pack; 2. Upper case body; 3. Lower case body; 4. Battery module; 5. Secondary battery.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

[Artificial Graphite]

The first aspect of the present application provides an artificial graphite, which includes secondary particles formed by agglomeration of primary particles. The artificial graphite has a volume average particle size Dv50, denoted as A, the artificial graphite through powder compaction under a pressure of 2000 kg has a volume average particle size Dv50, denoted as B, and A and B satisfy: B/A≥0.85.

The artificial graphite provided in the present application includes secondary particles formed by agglomeration of primary particles, and the volume average particle size of the artificial graphite and the volume average particle size of the artificial graphite through powder compaction under a pressure of 2000 kg meets a specific relationship. Therefore, the artificial graphite has higher structural strength, whose bulk structure stability is better, and which can still effectively keep its own low orientation during the process of preparing the negative electrode plate by rolling. When the artificial graphite is used for the electrode plate of the secondary battery, the selectivity of the artificial graphite in a particular direction during the lithium intercalation is significantly reduced. The volume expansion of artificial graphite during the lithium intercalation can be effectively dispersed in all directions, so that the volume expansion of the secondary battery with the artificial graphite during the cycle is significantly reduced.

A small volume increase of batteries during cycle is conducive to maintaining a higher energy density of the batteries. In particular, batteries with a low cyclic expansion can maintain an internal structure suitable for electrolyte infiltration during cycle, so that an electrolyte can fully infiltrate an electrode assembly, thereby increasing the cycle life of the batteries. Moreover, due to a small swelling force during cyclic expansion of the battery, the deformation of the electrode assembly under the swelling force can also be reduced, so that the safety performance of the battery is also improved. The performance such as safety performance of the apparatus using the secondary battery is also improved accordingly.

The volume average particle size A and B of the artificial graphite can be measured by a laser particle size analyzer, for example, a Malvern Master Size 3000 laser particle size analyzer. Specifically, the volume average particle size Dv50 of the artificial graphite can be measured by a laser particle size analyzer and denoted as A; then the above measured artificial graphite for A is pressed through powder compaction under a pressure of 2000 kg for 20 seconds, the volume average particle size Dv50 of the resulting artificial graphite is measured by laser particle size analysis, and denoted as B. The dispersion medium used for the test can be water, such as deionized water. Laser particle size analysis can be carried out according to standard GB/T 19077.1-2016.

The ratio B/A of the volume average particle size B of the artificial graphite compacted through powder compaction under a pressure of 2000 kg to the volume average particle size A of the artificial graphite may be ≥0.85, ≥0.86, ≥0.88, ≥0.89. The larger B/A, the better the structural stability of artificial graphite is. Further, B/A may be ≤0.98, ≤0.95, ≤0.93, ≤0.92. An appropriate B/A may enable the artificial graphite not only to have higher powder compaction density, but also to have better structural stability, which can make the secondary battery have higher gram capacity and lower cyclic expansion. Preferably, 0.88≤B/A≤0.92.

In some embodiments, when the artificial graphite of the present application is present in an electrode plate with a compacted density of 1.6 g/cm$^3$ to 1.7 g/cm$^3$, the orientation index OI of the artificial graphite is 6 to 15. For example, when the artificial graphite of the present application is present in an electrode plate with a compacted density of 1.6 g/cm$^3$ to 1.7 g/cm$^3$, the OI value of the artificial graphite can be 6 or more, 7 or more, 8 or more, or 8.5 or more; 15 or less, 13 or less, 12 or less, 11.5 or less. Preferably, when the artificial graphite of the present application is present in an electrode plate with a compacted density of 1.6 g/cm$^3$ to 1.7 g/cm$^3$, the OI value of the artificial graphite is from 8 to 12.

When an artificial graphite with an appropriate OI value is used for the electrode plate, it can have a higher degree of isotropy, so that the expansion of the artificial graphite in the electrode plate is dispersed in all directions during the lithium intercalation, which can further reduce the cyclic expansion of electrode plates and batteries. At the same time, the artificial graphite has a higher binding force with a negative electrode current collector, which can further reduce the cyclic expansion of electrode plates and the batteries. In addition, since the electrode plate using the artificial graphite can also have a higher compacted density, the battery can obtain a higher energy density.

In the present application, an orientation index of an artificial graphite is defined as OI=$I_{004}/I_{110}$ in which in the X-ray diffraction analysis of the artificial graphite, the peak area of the diffraction peak attributed to 004 crystal plane of the artificial graphite is $I_{004}$, and the peak area of the diffraction peak attributed to 110 crystal plane of the artificial graphite is $I_{110}$. The X-ray diffraction analysis can be carried out according to standard JISK 0131-1996, and an X-ray diffractometer (such as Bruker D8 Discover X-ray diffractometer) is used for testing. In the X-ray diffraction analysis test, a copper target can be used as an anode target, CuKβ rays are filtered by a Ni filter with a thickness of 0.02 mm, and CuKα rays are used as a radiation source, with the ray wavelength λ=1.5418 Å (taken the weight average of Kα1 and Kα2), the scanning 2θ angle range of 20° to 80°, and the scanning rate of 4°/min.

The 2θ angle corresponding to 004 crystal plane of artificial graphite is from 53.5° to 55.5° (for example, 54.5°); the 2θ angle corresponding to 110 crystal plane of artificial graphite is 76.5° to 78.5° (for example, 77.4°).

An exemplary preparation method of the electrode plate for testing the orientation index OI of the above-mentioned artificial graphite is as follows:
The artificial graphite of the present application, styrene-butadiene rubber (SBR) as a binder, sodium carboxymethyl cellulose (CMC-Na) as a thickener, and a conductive agent (Super P) are dispersed in deionized water in a mass ratio 96.2:1.8:1.2:0.8, and mixed uniformly to obtain a slurry; the slurry is applied evenly to a copper foil current collector in an areal density of 10 mg/cm$^2$ to 11 mg/cm$^2$ (for example, 10.7 mg/cm$^2$), the dried electrode plate is cold pressed through a cold pressing to obtain a compacted density of 1.6 g/cm$^3$ to 1.7 g/cm$^3$ (for example, 1.65 g/cm$^3$). The prepared electrode plate is placed in an X-ray diffractometer, and the peak area C004 of the 004 crystal plane diffraction peak of the artificial graphite in the electrode plate and the peak area C110 of the 110 crystal plane diffraction peak of the artificial graphite are obtained by X-ray diffraction analysis. The orientation index OI value is C004/C110.

In some embodiments, in order to better enable the artificial graphite to have both lower orientation and higher structural strength at the same time, the artificial graphite may be obtained by graphitizing green coke. The green coke may comprise one or more of green petroleum coke, green pitch coke and metallurgical coke, and preferably comprises green petroleum coke. Further, the green coke is non-needle coke. For example, the green coke is one or more selected from non-needle green petroleum coke and non-needle green pitch coke; preferably, non-needle green petroleum coke.

Figure 1B:
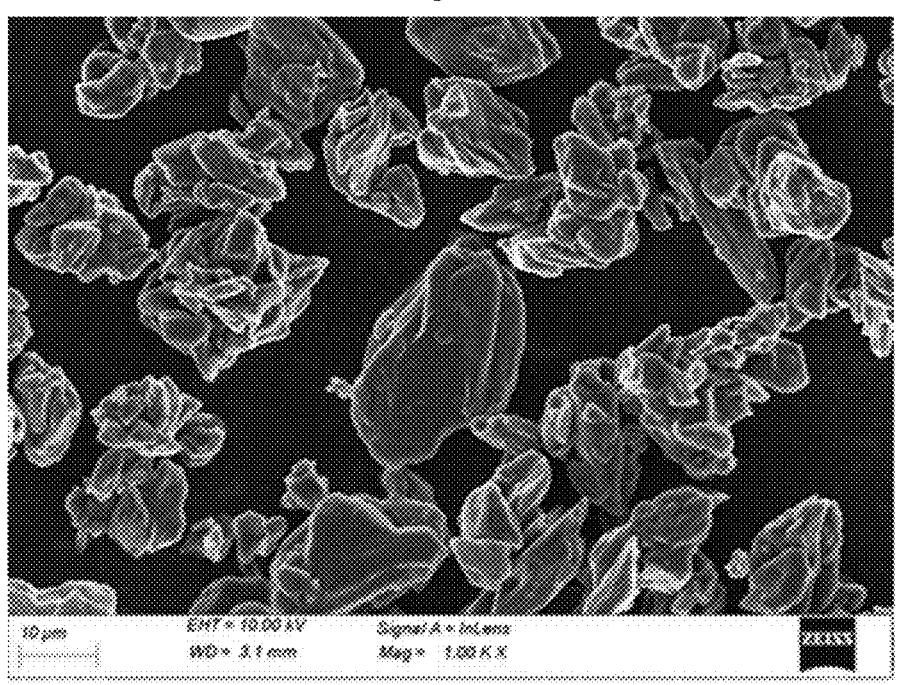
Figure 1C:
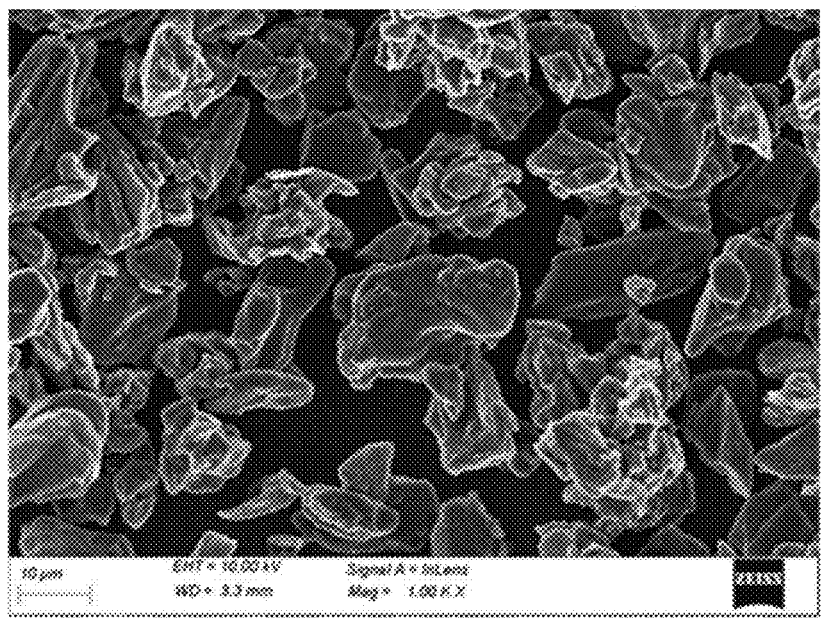

In some embodiments, the morphology of the secondary particles may be one or more of a block shape, a spherical shape, and a spheroid shape. The spheroid shape is, for example, ellipsoid, ellipsoidal, or substantially spherical structure, which is conducive to reducing the degree of orientation of the artificial graphite, thereby reducing the cyclic expansion of the battery. FIGS. 1a-1c are SEM images showing morphology of artificial graphite as an example.

In some embodiments, the artificial graphite particles have a dense internal structure. The bulk stability of the artificial graphite is further improved, and the cyclic expansion performance of the battery containing the same is further improved.

Figure 2:
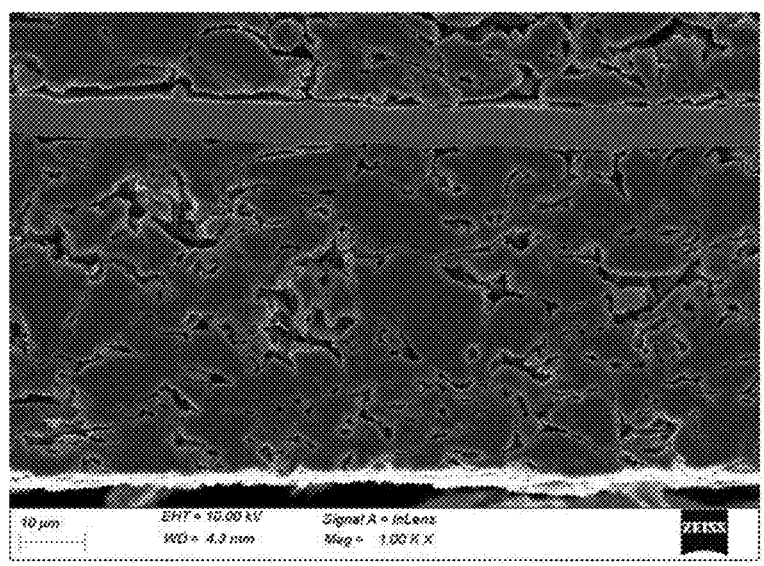
FIG. 2 is an SEM images of the cross section of artificial graphite particles provided by an embodiment of the present application.

FIG. 2 shows an SEM image of the cross-section of artificial graphite particles as an example. As shown in FIG. 2, there are few pores and defects inside the particles of artificial graphite, whose structure is dense.

In some embodiments, the numerical particle size $D_n10$ of the artificial graphite is ≥1 μm. For example, $D_n10$ can be ≥1.2 μm, ≥1.3 μm, ≥1.5 μm. The artificial graphite has a suitable $D_n10$, which can make it have a higher gram capacity. In addition, the $D_n10$ of the artificial graphite makes its active specific surface area smaller, so there are fewer side reactions between the artificial graphite and the electrolyte, and the cyclic expansion of the battery can be further reduced.

Further, the $D_n10$ of the artificial graphite is ≤4 μm, ≤3.5 μm, ≤3 μm, ≤2.5 μm, or ≤2 μm. Preferably, 1.2 μm≤$D_n10$≤3 μm. In the artificial graphite containing an appropriate amount of smaller particles, the smaller particles can be filled in the pores between the larger particles, so that the artificial graphite can have a higher tap density and powder compaction density. Thus, the negative electrode plate using such artificial graphite can obtain a higher electrode plate compaction density, so that the energy density of the battery can be further improved.

The inventors found that the artificial graphite having an appropriate graphitization degree G can have a higher gram capacity and a higher phase structural stability at the same time. In some embodiments, the graphitization degree G of the artificial graphite is from 92% to 95%, more preferably from 92% to 94%.

The graphitization degree G of artificial graphite within the above range can make the artificial graphite have a higher powder compaction density and gram capacity. In particular, the graphitization degree G within the above range can also prevent the artificial graphite from co-intercalation of a solvent during the battery cycle, and the graphite layer is not easily peeled off, thereby reducing the cyclic expansion of the electrode plate and the battery. At the same time, the structural stability of the artificial graphite is higher, its B/A ratio is higher and it is not easy to disintegrate during the rolling process of preparing the negative electrode plate. Therefore, the cohesion between the particles in the electrode plate is relatively high, which can reduce the expansion the electrode plate and the battery during cycle process.

In some embodiments, the $I_D/I_G$ of the artificial graphite is ≤0.25. For example, the $I_D/I_G$ of the artificial graphite can be ≤0.23, ≤0.2, ≤0.18, ≤0.16, or ≤0.15. With the $I_D/I_G$ of the artificial graphite within an appropriate range, it can be considered that the surface stability of the artificial graphite is high, which can decrease the side reaction of electrolyte on its surface and further reduce the volume expansion of the secondary battery during the cycle. Further, the $I_D/I_G$ of the artificial graphite can be ≥0.05, ≥0.08, ≥0.1, or ≥0.12, which enables artificial graphite to have higher electrochemical reaction activity and meet the requirements on the kinetic properties of the battery. Preferably, 0.1≤$I_D/I_G$≤1.2.

$I_D/I_G$ represents the ratio of the peak intensity $I_D$ of the peak D to the peak intensity $I_G$ of the peak G. The peak D and peak G are the Raman characteristic peaks of graphite materials. The peak D and peak G of the artificial graphite can be measured by laser Raman spectroscopy, such as Advantage 785™ Raman spectrometer. In the Raman spectrum of the artificial graphite of the present application measured by a Raman spectrometer, the peak D is at the position of 1300 cm$^{-1}$ to 1400 cm$^{-1}$, and the peak G is at the position of 1580 cm$^{-1}$ to 1620 cm$^{-1}$.

In some embodiments, preferably the specific surface area SSA of the artificial graphite may be from 0.5 m$^2$/g to 2.0 m$^2$/g. For example, the specific surface area SSA of the artificial graphite can be 0.5 m$^2$/g or more, 0.7 m$^2$/g or more, 0.8 m$^2$/g or more, 1 m$^2$/g or more; and can be 2.0 m$^2$/g or less, 1.8 m$^2$/g or less, 1.5 m$^2$/g or less, 1.3 m$^2$/g or less. More preferably, the specific surface area SSA of the artificial graphite is from 0.8 m$^2$/g to 1.5 m$^2$/g.

The artificial graphite has an appropriate specific surface area, which can have higher electrochemical reaction activity, can reduce the side reactions of the electrolyte on its surface and reduce the gas production while satisfying the kinetic performance requirement of secondary batteries, thereby reducing the volume expansion of the secondary battery during the cycle. In addition, the artificial graphite having a proper specific surface area also has a strong bonding force with a binder, which can improve the cohesion and bonding force of the electrode plate, thereby further reducing the cyclic expansion of the battery.

In some preferred embodiments, the artificial graphite also optionally satisfies the specific surface area SSA of 0.5 m$^2$/g to 2.0 m$^2$/g, and $I_D/I_G \leq 0.25$, which can further improve the surface stability of the artificial graphite, thereby further reducing the cyclic expansion of the battery. Preferably, the SSA of the artificial graphite is from 0.8 m$^2$/g to 1.5 m$^2$/g. Preferably, the artificial graphite satisfies $0.1 \leq I_D/I_G \leq 0.2$.

In some embodiments, the volume-average particle size D$_v$50 of the artificial graphite may be from 12 μm to 20 μm. For example, the D$_v$50 of the artificial graphite may be from 13 μm to 18 μm, preferably from 15 μm to 18 μm.

A suitable D$_v$50 makes the artificial graphite have higher performance for transporting active ion and electron, and at the same time, it can also reduce the side reaction of the electrolyte in the negative electrode. In addition, artificial graphite with a suitable D$_v$50 is also beneficial to increasing its own powder compaction density, so that the electrode plate using the artificial graphite can obtain a higher compaction density, and therefore can increase the energy density of the battery.

In some embodiments, the particle size D$_v$10 of the artificial graphite is ≥6 μm. For example, the D$_v$10 of the artificial graphite can be ≥6 μm, ≥6.5 μm, ≥7 μm, or ≥7.5 μm. The artificial graphite has a small active specific surface area, which can further reduce side reactions in the secondary battery. Further, the D$_v$10 of the artificial graphite may be ≤11 μm, ≤10.5 μm, ≤10 μm, ≤9.5 μm, or ≤9 μm, which is conducive to making the electrode plate obtain a higher compaction density. Preferably, 6.5 μm≤D$_v$10≤10.5 μm.

The particle size span of artificial graphite is defined as Span=(D$_v$90−D$_v$10)/D$_v$50. In some embodiments, the particle size span of the artificial graphite may be from 1.1 to 1.8, preferably from 1.2 to 1.5.

If the particle size span of the artificial graphite is appropriate, the artificial graphite contains an appropriate amount of larger particles and smaller particles, which can improve the stacking performance between the artificial graphite particles, and the negative electrode plate containing the same has an appropriate porosity. At the same time, the artificial graphite can also have a proper active specific surface area, so that it has both higher electrochemical reaction activity and higher surface stability. Therefore, there are fewer side reactions of the electrolyte on the surface of the artificial graphite, which can greatly reduce the consumption of the electrolyte caused by side reactions and the increase in the thickness of the SEI (solid electrolyte interphase) film on the surface of the material. In this way, the low cyclic expansion performance of the battery is further improved.

In addition, the appropriate particle size span (Span) can also make the artificial graphite have a higher tap density and powder compaction density. The compaction density of the electrode plate using the artificial graphite is therefore relatively high, which can increase the energy density of the battery.

In some embodiments, the tap density of artificial graphite may be from 0.85 g/cm$^3$ to 1.35 g/cm$^3$, preferably from 0.95 g/cm$^3$ to 1.15 g/cm$^3$.

In some embodiments, the compacted density of artificial graphite under a pressure of 2000 kg is from 1.65 g/cm$^3$ to 1.85 g/cm$^3$, preferably from 1.68 g/cm$^3$ to 1.83 g/cm$^3$.

The artificial graphite has a higher powder compaction density under a pressure of 2000 kg, and the negative electrode plate using the artificial graphite can have a higher compaction density, so that the battery has a higher energy density.

In some embodiments, the artificial graphite may comprise a primary particle and a secondary particle. The proportion of the number of the secondary particles in the artificial graphite is ≥60%, ≥65%, ≥70%, ≥75%, or ≥80%. Further, the proportion of the number of the secondary particles in the artificial graphite is ≤95%, ≤90%, or ≤85%. The orientation index OI value of artificial graphite in the negative electrode plate is small, so the cyclic expansion of the negative electrode plate and the battery can be reduced. The artificial graphite when contains a proper amount of primary particles can increase its tap density and powder compaction density. Preferably, the proportion of the number of secondary particles in the artificial graphite is from 70% to 90%.

In some embodiments, the powder resistivity of artificial graphite under a pressure of 8 MPa may be 0.030 Ω·cm or less, preferably 0.020 Ω·cm or less. Artificial graphite has a higher conductivity, which can enable the negative electrode plate pole containing the same to obtain high conductivity. In this way, the battery has a small polarization phenomenon, and a better dynamic performance, thereby having a higher cycle life.

In some preferred embodiments, when the artificial graphite also satisfies the SSA of from 0.5 m$^2$/g to 2.0 m$^2$/g, ID/IG≤0.25 and Dn10≥1 μm, the artificial graphite can reduce the cyclic expansion of the battery and also have a higher gram capacity. When the artificial graphite further satisfies the graphitization degree of 90%-95%, its own gram capacity can be further improved.

In some preferred embodiments, the gram capacity of the artificial graphite of the present application is from 350 mAh/g to 359 mAh/g, for example, from 350 mAh/g to 357 mAh/g, and for example, from 352 mAh/g to 355 mAh/g. The artificial graphite of the present application has both high gram capacity and high structural stability. Thus, it is not easy to disintegrate during the rolling process for preparing the negative electrode plate, so that the cohesion between the particles in the electrode plate is relatively high, thereby reducing the cyclic expansion of the electrode plates and the battery.

In some preferred embodiments, the artificial graphite may also optionally satisfy the Dv50 of 12 μm-22 μm, Dv10≥6 μm, and SSA of 0.5 m$^2$/g-2.0 m$^2$/g simultaneously. More preferably, the artificial graphite also optionally satisfies the Dv50 of from 15 μm to 18 μm, Dv10 of from 6.5 μm to 10.5 μm, (Dv90−Dv10)/Dv50 of from 1.2 to 1.5, and SSA of from 0.8 m$^2$/g to 1.5 m$^2$/g.

The artificial graphite has a better particle combination, which enables it to obtain a higher packing density, thereby increasing the powder compaction density of the artificial graphite, which is beneficial to increase the energy density of the battery. In addition, the specific surface area of the artificial graphite is conducive to meeting its electrochemical reaction activity requirements, and the particle-to-particle combination effect of the artificial graphite is better, so that the negative electrode plate has higher liquid-phase ion transport performance and solid-phase ion transport performance, thereby ensuring that the battery has a good dynamic performance.

In some embodiments, at least a part of surface of the artificial graphite has a coating layer. For example, there is a coating layer on 80% to 100% of the surface of artificial graphite. Optionally, the coating layer comprises amorphous carbon. For example, the coating layer is an amorphous carbon coating layer. By covering the artificial graphite with a coating layer, the dynamic performance of the artificial graphite can be improved.

In the present application, the $D_n10$, $D_v10$, $D_v50$, and $D_v90$ of the artificial graphite can be measured with a laser particle size analyzer (such as Malvern Master Size 3000) with reference to the standard GB/T 19077.1-2016.

In the context, the physical definitions of $D_n10$, $D_v10$, $D_v50$, and $D_v90$ are as follows:

$D_n10$: the particle size at which the artificial graphite reaches 10% of cumulative number distribution percentage;

$D_v10$: the particle size at which the artificial graphite reaches 10% of cumulative volume distribution percentage;

$D_v50$: the particle size at which the artificial graphite reaches 50% of cumulative volume distribution percentage;

$D_v90$: the particle size at which the artificial graphite reaches 90% of cumulative volume distribution percentage.

The internal compactness of the artificial graphite can be tested using a method known in the art. For example, the artificial graphite can be mixed with a binder (such as polyvinylidene fluoride PVDF solution) and then coated on copper foil, and an argon ion polisher (such as IB-19500CP) can be used to cut the electrode plate to obtain the cross section of the artificial graphite particles. After that, a scanning electron microscope & energy spectrometer (such as sigma300) is used to test the cross section with reference to JY/T010-1996.

The morphology of the artificial graphite can be tested using a method known in the art. For example, the artificial graphite is adhered on the conductive glue, and the morphology of the particles is tested using a scanning electron microscope & energy spectrometer (such as sigma300). The test can refer to JY/T010-1996.

The proportion of the number of the secondary particles in the artificial graphite can be tested by a prescribed method. For example, the artificial graphite is adhered on the conductive glue, and the scanning electron microscope & energy spectrometer (such as sigma300) is used to test the morphology of the particles. The test can refer to JY/T010-1996. The magnification is 500 times, and the number of secondary particles and the total number of particles are counted. The proportion of secondary particles is the ratio of the number of secondary particles to the total number of the particles.

The specific surface area SSA of the artificial graphite can be measured using a method known in the art. For example, according to GB/T 19587-2017 (Determination of the specific surface area of solids by gas adsorption using the BET method), analysis of the specific surface area by the nitrogen adsorption can be used, and the specific surface area can be calculated by the BET (Brunauer Emmett Teller) method, in which the analysis of the specific surface area by the nitrogen adsorption can be carried out by a specific surface and pore size distribution analyzer (Type: Tri Star II 3020) from Micromeritics, USA.

The tap density of the artificial graphite can be measured using a method known in the art. For example, refer to the standard GB/T 5162-2006 and use a powder tap density tester (such as Bettersize BT-301, Dandong, China) to test.

The powder compaction density of the artificial graphite can be tested by a method known in the art. For example, refer to GB/T 24533-2009 and use an electronic pressure testing machine (such as UTM7305) to test: put a certain amount of powder on a special compaction mold, set different pressures, and read the thickness of the powder under different pressures on the equipment, and calculate the compaction density under different pressures. In the GB/T 24533-2009, the machine used for the measurement of the powder compaction density has a shim with a diameter of 13 mm, a top post with a diameter of 13 mm, and a metal cylindrical sleeve with an inner diameter of 13 mm.

The graphitization degree of the artificial graphite can be measured with a well-known method in the art. For example, the graphitization degree of the artificial graphite can be measured using an X-ray diffractometer (Bruker D8 Discover). The test can refer to JIS K 0131-1996, JB/T 4220-2011: measuring the size of $d_{002}$, and then calculating the graphitization degree according to the formula $G=(0.344-d_{002})/(0.344-0.3354)\times 100\%$, in which $d_{002}$ is the interlayer spacing in the artificial graphite crystal structure, in nm.

The powder resistivity of the artificial graphite can be tested using a method known in the art. For example, a resistivity tester (such as ST2722) can be used to test based on a four-probe method. Put a certain amount of sample in a feeding cup of the resistivity tester, apply the pressure to 8 MPa, collect data manually, and record the powder resistivity test results. The test refers to GB/T 30835-2014.

Next, the present application also provides a method for preparing the artificial graphite, by which any artificial graphite of the present application can be prepared.

The method for preparing artificial graphite provided by an embodiment of the present application comprises the following steps:

S10: crushing green coke materials and classifying them to remove fine powder, so as to obtain a precursor;

S20: shaping the precursor crushed in step S10; and

S30: granulating the precursor treated in step S20.

In an embodiments of the present application, during the process of granulating, a binder is added and the amount of the binder does not exceed 5% of the total weight of the green coke materials. That is to say, the amount of the binder is 5% or less of the total weight of the green coke material. Preferably, during the process of granulating, no binder is added. That is to say, the amount of the binder is 0% relative to the total weight of the green coke materials.

S40: performing graphitization treatment on the product obtained in step S30 at a temperature of 2800-3200° C. to obtain the artificial graphite.

In the above preparation method, in step S10, the green coke material may be one or more of selected from green petroleum coke, green pitch coke and metallurgical coke, and preferably comprises green petroleum coke.

Preferably, the green coke is non-needle coke. The non-needle coke may be one or more selected from non-needle green petroleum coke, non-needle green pitch coke and non-needle metallurgical coke. Preferably, the non-needle coke comprises non-needle green petroleum coke.

In some embodiments, in step S10, preferably, the volatile content of the green coke is 6%-12% (weight percentage). For example, the volatile content of the green coke powder can be 6% or more, 7% or more, or 8% or more; and can be 12% or less, 11% or less, 10% or less, or 9% or less. Preferably, the volatile content of the green coke is from 7% to 10%.

The volatile content of the green coke is appropriate, which can make the prepared artificial graphite have higher structural strength. At the same time, the green coke material is also conducive to forming a dense structure of artificial graphite, and further improving the structural strength of artificial graphite. The green coke material is conducive to ensuring the B/A ratio of the artificial graphite to satisfy the above mentioned requirements.

The volatile content of the green coke can be tested using a method known in the art. For example, refer to SH/T 0026-1990.

In some embodiments, the sulfur content of the green coke may be 2% or less, preferably 1% or less, and more preferably 0.6% or less. The green coke has a low sulfur content, which can reduce the probability that the specific surface area of artificial graphite will increase due to the escape of more sulfur components in the subsequent process. This is beneficial to making the specific surface area of artificial graphite meet the aforementioned requirements.

The sulfur content of green coke can be tested by a method known in the art, for example, with reference to GB/T 2286-2008.

In step S10, equipment and method known in the art can be used to crush the green coke material, such as jet mill, mechanical mill or roller mill. The crushing process often produces a lot of too small particles, sometimes there are too large particles, so after crushing, it can be classified according to the requirements to remove the too small particles and the too large particles in the powder after crushing. After the classification treatment, a precursor with a better particle size distribution can be obtained, which is convenient for the subsequent shaping and granulation process. The classification treatment can be carried out by using equipment and method known in the art, such as a classification screen, a gravity classifier, a centrifugal classifier, and the like.

By adjusting the particle size distribution of the granular product obtained in step S10, such as $D_v50$ within an appropriate range, the degree of granulation in the subsequent granulation step can be improved, and the artificial graphite itself can have a higher degree of isotropy and also have a higher gram capacity.

In step S20, the edges and corners of the granular precursor as obtained are polished by shaping. This facilitates the subsequent granulation process and makes the secondary particles of the obtained artificial graphite have higher stability.

In step S20, equipment and method known in the art may be used to perform shaping treatment on the starting particles, such as a shaping machine or other shaping equipment.

In some embodiments, step S20 further includes removing fine powder after shaping. Through the fine powder removal treatment after shaping, the $D_n10$ of the shaped particle product can be adjusted to be in an appropriate range, so that the $D_n10$ of the obtained artificial graphite is within the required range. In some embodiments, in step 20 the $D_n10$ of the obtained particles is controlled to be 0.5 μm or more, preferably from 0.5 μm to 1.5 μm.

In step S20, equipment and method known in the art can be used to remove fine powder, such as a grading screen, a gravity classifier, a centrifugal classifier, and the like.

In step S30, the granular product obtained in step S20 is granulated, so that the independently dispersed primary particles are aggregated to form secondary particles, which can significantly increase the isotropy of artificial graphite, thereby reducing the OI value of the negative electrode plate. The amount of binder added during the granulation process does not exceed 5% of the total weight of the green coke material. Preferably, the granulation process is performed without adding a binder. For example, when the volatile content of the green coke material is at least 7%, the step S30 can granulate the precursor without adding a binder. The amount of the binder being controlled in a given range can further increase the gram capacity of artificial graphite; and also increase the overall structural strength of the artificial graphite particles, and control the B/A of the artificial graphite within the claimed range, thereby further reducing the cyclic expansion of the battery. The binder is preferably selected from asphalt. However, the volatile content of the green coke materials should not be too high, otherwise it will significantly reduce the gram capacity of the graphite material and affect its processing performance during subsequent use.

In step S30, equipment known in the art may be used for granulation, such as a granulator. The granulator usually includes a stirred reactor and a module for temperature control of the reactor. By adjusting the stirring speed, heating rate, granulation temperature, cooling rate, etc. in the granulation process, it is beneficial to improve the structural strength and isotropy of the obtained artificial graphite, so that the B/A ratio and orientation index OI of the artificial graphite can meet the demand.

Furthermore, by adjusting the above process conditions, the volume average particle size $D_v50$ of the granulated product can be within the required range, or the $D_v10$, $D_v50$, and $D_v90$ of the granulated product can all be within the required range.

By adjusting the particle size distribution of step S10 and/or S30, the $D_v50$, $D_v10$, $D_v90$ and/or $(D_v90-D_v10)/D_v50$ of the artificial graphite finally prepared can be within the required range.

In step S40, the granulated product obtained in step S30 is graphitized at a temperature of 2800° C. to 3200° C. to obtain an artificial graphite with a suitable graphitization degree. In some embodiments, the temperature for graphitization in step S40 may be from 2900° C. to 3100° C. When the graphitization degree is controlled within the given range, the artificial graphite has both a higher gram capacity, and a lower lattice expansion during the lithium intercalation.

In step S40, graphitization can be performed using equipment known in the art, such as a graphitization furnace, and further, for example, an Acheson graphitization furnace. After the graphitization process is completed, a small amount of oversized particles formed by agglomeration of the granulated product during the high-temperature graphitization process can be removed by sieving, which can prevent oversized particles from affecting material processing properties, such as stability and coating properties of the slurry.

In some embodiments, step S50 may be further included after step S40: mixing the artificial graphite obtained in step S40 with an organic carbon source, and then carrying out a heat-treatment at a temperature of 850° C. to 1250° C. to obtain an artificial graphite having a coating layer. The organic carbon source can be one or more selected from phenolic resin, asphalt, furfural resin, and epoxy resin, preferably asphalt.

Secondary Battery

The second aspect of the present application provides a secondary battery. The secondary battery comprises a negative electrode plate, the negative electrode plate comprises a negative active material, and the negative active material comprises the artificial graphite described in the first aspect of the present application.

Since the secondary battery of the present application adopts the artificial graphite of the first aspect of the present application, it has a lower volume expansion during the cycle process, which improves the cycle life and safety performance of the secondary battery. Furthermore, the secondary battery of the present application also has a higher energy density.

The secondary battery also comprises a positive electrode plate and an electrolyte. During the charging and discharging process of the battery, active ions are intercalated and de-intercalated back and forth between the positive electrode plate and the negative electrode plate. The electrolyte conducts ions between the positive electrode plate and the negative electrode plate.

[Negative Electrode Plate]

The negative electrode plate comprises a negative electrode current collector and a negative electrode film disposed on at least one surface of the negative electrode current collector. As an example, the negative electrode current collector has two opposite surfaces in its own thickness direction, and the negative electrode film is laminated on either or both of the two opposite surfaces of the negative electrode current collector.

The negative electrode current collector can be made of materials with good electrical conductivity and mechanical strength, which serves as conduction and current collection. In some embodiments, a copper foil may be used as the negative electrode current collector.

The negative electrode film comprises a negative active material, and the negative active material comprises artificial graphite as described in the first aspect of the present application.

It should be noted that the parameters of each negative electrode film given in this application all refer to the parameter range of a single-sided film. When the negative electrode film is arranged on two opposite surfaces of the negative electrode current collector, the parameters of the negative electrode film on any one of the surfaces meet the requirements of the present application, which is considered to fall within the protection scope of the present application. In addition, the range of compacted density, areal density and the like in the present invention all refer to the parameter range obtained after cold compaction for assembling a battery.

In some embodiments, the negative active material optionally further comprises other active materials that can be used in the negative electrode of a secondary battery. As an example, other negative active materials may be one or more of other graphite materials, mesophase carbon microspheres (MCMB in short), hard carbon, soft carbon, silicon-based materials, and tin-based materials.

In some embodiments, the negative electrode film further comprises a binder. As an example, the binder may comprise one or more of polyacrylic acid (PAA), sodium polyacrylate (PAAS), polyacrylamide (PAM), polyvinyl alcohol (PVA), styrene butadiene rubber (SBR), sodium alginate (SA), polymethacrylic acid (PMAA), and carboxymethyl chitosan (CMCS).

In some embodiments, the negative electrode film optionally further comprises a thickener. As an example, the thickener may be sodium carboxymethyl cellulose (CMC-Na).

In some embodiments, the negative electrode film optionally further comprises a conductive agent. As an example, the conductive agent used for the negative electrode film can be one or more selected from graphite, superconducting carbon, acetylene black, carbon black, Ketjen black, carbon dots, carbon nanotubes, graphene, and carbon nanofibers.

[Positive Electrode Plate]

The positive electrode plate comprises a positive electrode current collector and a positive electrode film which is disposed on at least one surface of the positive electrode current collector. As an example, the positive electrode current collector has two opposite surfaces in its own thickness direction, and the positive electrode film is laminated on either or both of the two opposite surfaces of the positive electrode current collector.

The positive electrode current collector can be made of materials with good electrical conductivity and mechanical strength. In some embodiments, the positive electrode current collector may be an aluminum foil.

The positive electrode film comprises a positive electrode active material. The present application does not specifically limit the specific types of positive active materials, and materials known in the art for the positive electrode of secondary battery can be used, and those skilled in the art can make selections according to actual needs.

In some embodiments, the secondary battery can be a lithium-ion secondary battery. The positive active material may be selected from lithium transition metal oxides and modified materials thereof, and the modified material may be lithium transition metal oxide subjected to doping modification and/or coating modification. For example, the lithium transition metal oxide can be one or more selected from lithium cobalt oxide, lithium nickel oxide, lithium manganese oxide, lithium nickel manganese oxide, lithium nickel cobalt manganese oxide, lithium nickel cobalt aluminum oxide and lithium containing phosphate with olivine structure.

For example, the positive active material can be one or more selected from $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$(LFP) and $LiMnPO_4$.

In some embodiments, the positive electrode film optionally further comprises a binder. The types of the binder are not specifically limited, and those skilled in the art can make selections according to actual needs. For example, the binder used for the positive electrode film may comprise one or more of polyvinylidene fluoride (PVDF) and polytetrafluoroethylene (PTFE).

In some embodiments, the positive electrode film optionally further comprises a conductive agent. The types of the conductive agent are not specifically limited, and those skilled in the art can make selections according to actual needs. For example, the conductive agent used for the positive electrode film may comprise one or more of graphite, superconducting carbon, acetylene black, carbon black, Ketjen black, carbon dots, carbon nanotubes, graphene, and carbon nanofibers.

[Electrolyte]

The electrolyte conducts ions between the positive electrode plate and the negative electrode plate. There is no specific limitation on the type of electrolyte in the present application, and it can be selected according to the requirement. For example, the electrolyte may be selected from at least one of solid electrolyte and liquid electrolyte (i.e., electrolytic solution).

In some embodiments, an electrolytic solution is used as the electrolyte. The electrolytic solution comprises an electrolyte salt and a solvent.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate), and LiTFOP (lithium tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

In some embodiments, the electrolytic solution may optionally comprise an additive. For example, the additives may comprise negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

[Separator]

In the secondary batteries that use an electrolytic solution, and some secondary batteries that use solid electrolytes, a separator is also included. The separator is located between the positive electrode plate and the negative electrode plate to play a role of isolation. The separator is not particularly limited, and any well-known porous structure separator having electrochemical stability and mechanical stability can be selected. In some embodiments, the separator can be one or more of glass fiber, non-woven fabric, polyethylene, polypropylene, and polyvinylidene fluoride. The separator can be a single-layer film or a multilayer film. When the separator is a multilayer film, the materials of each layer may be the same or different.

[Outer Packaging]

In some embodiments, the secondary battery may comprise an outer packaging which is used to encapsulate the positive electrode plate, the negative electrode plate and the electrolyte. As an example, the positive electrode plate, the negative electrode plate and the separator can be laminated or wound to form an electrode assembly with a laminated structure or an electrode assembly with a wound structure, then the electrode assembly is encapsulated in an outer packaging; the electrolyte can be an electrolytic solution, which is used to infiltrate the electrode assembly. The number of electrode assemblies in the secondary battery can be one or more, which can be adjusted according to requirements.

In some embodiments, the outer packaging of the secondary battery may be a soft bag, such as a bag-type soft bag. The material of the soft bag can be plastic, such as one or more of polypropylene (PP), polybutylene terephthalate (PBT), and polybutylene succinate (PBS). The outer packaging of the secondary battery may also be a hard case, such as an aluminum case.

[Preparation of Secondary Battery]

An embodiment of the present application also provides a method for preparing a secondary battery, which comprises the step of using the artificial graphite of the first aspect of the present application to prepare a negative electrode plate.

In some embodiments, the step of preparing a negative electrode plate with the artificial graphite of the first aspect of the present application may include: dispersing the negative active material including the artificial graphite of the first aspect of the present application with a binder, and an optional thickener and conductive agent in a solvent in which the solvent can be deionized water to form a uniform negative electrode slurry; the negative electrode slurry is coated on the negative electrode current collector and after being dried, cold pressed, and other steps, the negative electrode plate is obtained.

The preparation of the secondary battery may further comprises the step of preparing a positive electrode plate. In some embodiments, a positive active material, a conductive agent, and a binder can be dispersed in a solvent (such as N-methylpyrrolidone, NMP for short) to form a uniform positive electrode slurry; the positive electrode slurry is coated on a positive electrode current collector; after being dried, cold pressed and other processes, the positive electrode plate is obtained.

The preparation of the secondary battery further comprise the step of assembling the negative electrode plate, the positive electrode plate, and the electrolyte to form a secondary battery. In some embodiments, the positive electrode plate, the separator, and the negative electrode plate can be wound or laminated in order, so that the separator is located between the positive electrode plate and the negative electrode plate to serve as isolation; the electrode assembly is placed in an outer packaging, and then an electrolyte is injected and sealed to obtain a secondary battery.

Figure 3:
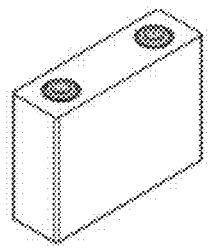
FIG. 3 is a schematic diagram of a secondary battery provided by an embodiment of the present application.

The present application does not particularly limit the shape of the secondary battery, which can be cylindrical, square or other arbitrary shapes. FIG. 3 shows a secondary battery 5 with a square structure as an example.

In some embodiments, the secondary battery can be assembled into a battery module, and the number of secondary batteries contained in the battery module can be multiple, and the specific number can be adjusted according to the application and capacity of the battery module.

Figure 4:
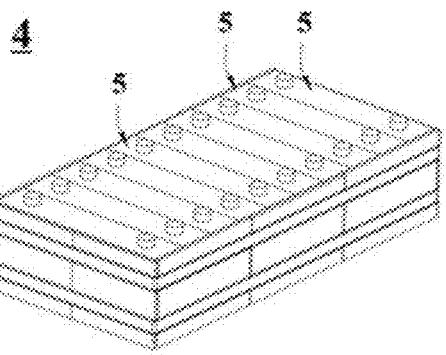
FIG. 4 is a schematic diagram of a battery module provided by an embodiment of the present application.

FIG. 4 shows a battery module 4 as an example. Referring to FIG. 4, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed by fasteners.

Optionally, the battery module 4 may further comprise a housing with a receiving space, and the plurality of secondary batteries 5 are received in the receiving space.

In some embodiments, the above-mentioned battery module may also be assembled into a battery pack, and the number of battery modules contained in the battery pack can be adjusted according to the application and capacity of the battery pack.

Figure 5:
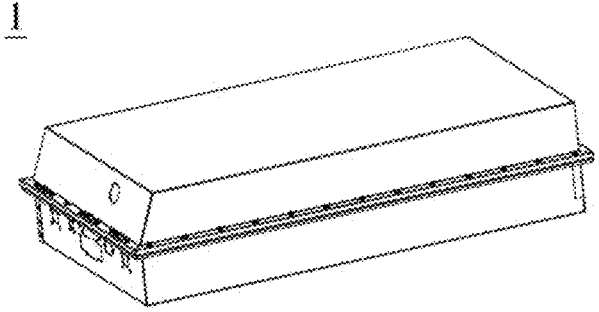
FIG. 5 is a schematic diagram of a battery pack provided by an embodiment of the present application.
Figure 6:
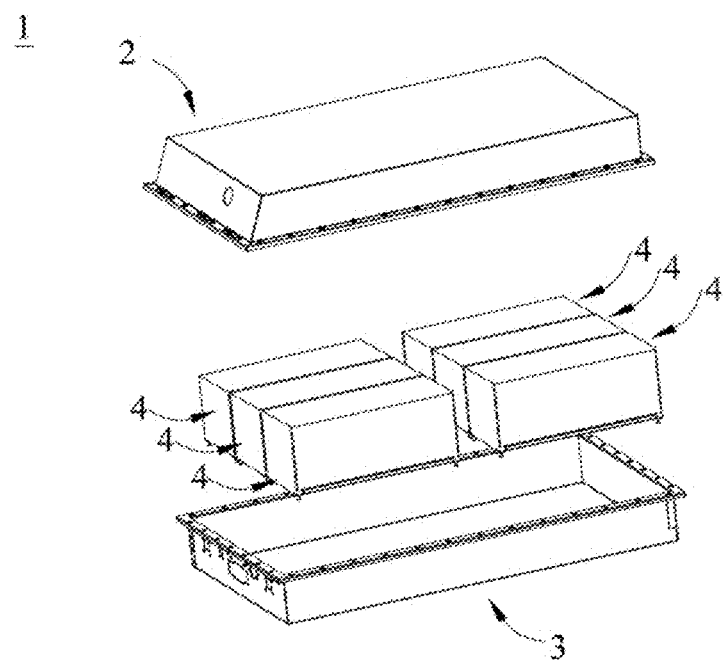
FIG. 6 is an exploded view of FIG. 5.

FIGS. 5 and 6 show a battery pack 1 as an example. Referring to FIGS. 5 and 6, the battery pack 1 may comprise a battery case and a plurality of battery modules 4 disposed in the battery case. The battery case comprises an upper case body 2 and a lower case body 3. The upper case body 2 can cover the lower case body 3 to form a closed space for receiving the battery modules 4. A plurality of battery modules 4 can be disposed in the battery case in any manner.

[Apparatus]

The third aspect of the present application provides an apparatus, comprising the secondary battery according to the second aspect of the present application. The secondary battery provides power to the apparatus. The apparatus of the present application uses the secondary battery provided by the present application, and thus has at least the same advantages as the secondary battery.

The apparatus may be, but is not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, and the like.

The apparatus may comprise the secondary battery, the battery module or the battery pack selected according to its usage requirements.

Figure 7:
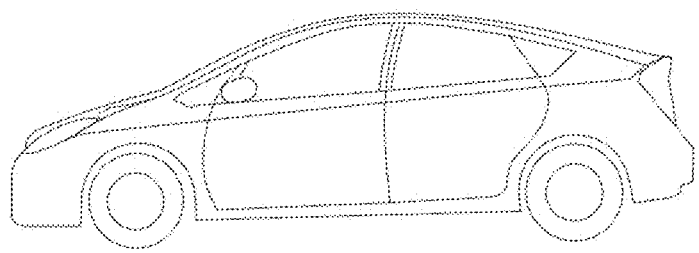
FIG. 7 is a schematic diagram of an apparatus provided by an embodiment of the present application.

FIG. 7 shows an apparatus as an example. The apparatus is a pure electric vehicle, a hybrid electric vehicle, or a plug-in hybrid electric vehicle. In order to meet the requirements of the apparatus for high power and high energy density of secondary batteries, the battery pack or battery module can be used.

As another example, the apparatus may be a mobile phone, a tablet computer, a notebook computer, and the like. The apparatus is generally required to be thin and light, and the secondary battery can be used as a power supply.

EXAMPLES

In order to describe the technical contents, structural features, achieved objectives and effects of the technical solutions in detail, the following detailed descriptions will be given in conjunction with specific embodiments. It should be understood that these embodiments are only used for explaining the present application, rather than limiting the scope of the present application. Unless otherwise stated, all parts, percentages, and ratios described in the following embodiments are based on weight, all reagents used in the embodiments are commercially available or synthesized according to conventional methods and can be directly used without further treatment, and all instruments used in the embodiments are commercially available.

Example 1

Preparation of Artificial Graphite

1) Crushing the raw material: the raw material (non-needle green petroleum coke) was crushed by using a mechanical mill or roller mill. The non-needle green petroleum coke had a volatile content of 9.5% and a sulfur content of 0.6%. After crushing, classification treatment was carried out to control the particle size distribution so as to obtain a precursor.

2) Shaping: shaping the precursor obtained after crushing.

3) Granulating: the shaped precursor was put into the reactor of the granulator, and granulated without adding a binder.

4) Graphitization: the granulated product was added into a graphitization furnace, and heated up to 3000° C. for ultra-high temperature graphitization to obtain artificial graphite.

Preparation of Negative Electrode Plate

The artificial graphite prepared above, a conductive agent (Super P), a binder (styrene butadiene rubber emulsion), and a thickener (CMC-Na) were fully stirred and mixed at a mass ratio of 96.2:0.8:1.8:1.2 in an appropriate amount of deionized water to form a uniform negative electrode slurry; the negative electrode slurry was coated on the surface of the negative electrode current collector copper foil, dried and cold pressed to obtain a negative electrode plate. The compaction density of the negative electrode plate was 1.65 g/cm$^3$, and the areal density was 10.7 mg/cm$^2$.

Preparation of Positive Electrode Plate

The positive active material lithium nickel cobalt manganese oxide (LiNi$_{0.5}$Co$_{0.2}$Mn$_{0.3}$O$_2$) (NCM523), the conductive agent (Super P), and the binder (PVDF) were fully stirred and mixed at a weight ratio of 96.2:2.7:1.1 in an appropriate amount of NMP to form a uniform positive electrode slurry; the positive electrode slurry was coated on the surface of the positive electrode current collector aluminum foil, dried and cold pressed to obtain a positive electrode plate. The compaction density of the positive electrode plate was 3.45 g/cm$^3$, and the areal density was 18.8 mg/cm$^2$.

Preparation of Electrolyte

Ethylene carbonate (EC), ethyl methyl carbonate (EMC), and diethyl carbonate (DEC) were mixed at a volume ratio of 1:1:1, and then LiPF$_6$ was uniformly dissolved in the above solution to obtain an electrolyte, in which the concentration of LiPF$_6$ was 1 mol/L.

Separator

Polyethylene (PE) film was used as a separator.

Preparation of Secondary Battery

The positive electrode plate, the separator, and the negative electrode plate were stacked in order, and an electrode assembly was obtained after winding; then the electrode assembly was put into the outer packaging, and the above-mentioned electrolyte was added, and after encapsulation, standing, formation, and aging, a secondary battery was obtained. The outer packaging was a hard case with length×width×height=148 mm×28.5 mm×97.5 mm.

Examples 2-7

The preparation method was similar to Example 1 with the exception that the preparation parameters of the artificial graphite were adjusted to obtain artificial graphite having different B/A values.

Comparative Example 1

The preparation method was similar to Example 1 with the exception that the preparation parameters of the artificial graphite were adjusted to obtain artificial graphite having different B/A values. In addition, in the Comparative Example 1, the raw materials was calcined needle-like petroleum coke, and an asphalt was added in the granulation step 3) as a binder, wherein the amount of asphalt was present in an amount of 8%, based on the total weight of the calcined needle-like petroleum coke.

Comparative Example 2

The preparation method was similar to Comparative Example 1 with the exception that the granulation step 3) was omitted and the preparation parameters of the artificial graphite were adjusted to obtain artificial graphite having different B/A values.

Test Section (1) Cyclic Expansion Rate of Negative Electrode Plate

The thickness of the negative electrode plate after cold pressing was recorded as H$_0$. The cold-pressed negative electrode plate, positive electrode plate, separator, and electrolyte were made into a secondary battery. At 25° C., the secondary battery was subjected to a 100% DOD (100% depth of discharge, that is to say, fully charged and then fully discharged) 1 C/1 C cycle in the NEWARE charge and discharge machine. The discharge capacity of the first cycle (i.e. the initial capacity) was recorded as 100%. When the cycle capacity retention rate was 80% of the initial capacity, the cycle stopped. Then the secondary battery was charged to 100% SOC (State of Charge), and disassembled, and then the thickness of the corresponding negative electrode plate was measured and denoted as $H_1$. The cyclic expansion rate of the negative electrode plate was: $(H_1/H_0-1) \times 100\%$.

(2) Gram Capacity of the Artificial Graphite

The prepared artificial graphite, Super P as a conductive agent, PVDF as a binder and NMP (N-methylpyrrolidone) as a solvent were mixed uniformly at a mass ratio of 91.6:1.8:6.6 to form a slurry; the slurry was coated on a copper foil current collector, dried in an oven for later use. A lithium metal sheet was used as the counter electrode; polyethylene (PE) film was used as the separator; and ethylene carbonate (EC), ethyl methyl carbonate (EMC), and diethyl carbonate (DEC) were mixed in a volume ratio of 1:1:1, and then $LiPF_6$ was uniformly dissolve in the above solution to obtain an electrolyte, in which the concentration of $LiPF_6$ was 1 mol/L; the above parts were assembled into CR2430-type button battery in a glove box protected by argon.

After standing for 12 hours, the button battery was discharged at a constant current of 0.05 C to 0.005V and kept standing for 10 minutes; then it was discharged at a constant current of 50 μA to 0.005V and kept standing for 10 minutes; afterwards it was discharged at a constant current of 10 μA current to 0.005V; finally the battery was charged at a constant current of 0.1 C to 2V, and the charge capacity was recorded at this time. The ratio of the charge capacity to the mass of the artificial graphite was the gram capacity of the prepared artificial graphite.

(3) Kinetic Performance of the Battery

At 25° C., the batteries prepared in the Examples and Comparative examples were fully charged at x C and then fully discharged at 1 C for 10 times, and finally fully charged at x C; afterwards the negative electrode plates were taken out and the lithium precipitation on the surface of the electrode plate was observed. If no lithium was precipitated on the surface of the negative electrode, the battery was tested with the charge rate x C with an increments of 0.1 C until lithium was precipitated on the surface of the negative electrode, and then the test was stopped. At this time, the charge rate (x−0.1) C was the maximum charge rate of the battery.

TABLE 1-1

Preparation parameters of the artificial graphite in Examples 1-7 and Comparative Examples 1-2

| | Type of raw materials | Volatile content [wt %] | Sulfur content [wt %] | Graphitization temperature [° C.] | Morphology of artificia lgraphite |
|---|---|---|---|---|---|
| Example 1 | Non-needle green petroleum coke | 9.5 | 0.6 | 3000 | Amount of secondary particles ≥67% |
| Example 2 | Non-needle green petroleum coke | 9.1 | 1.5 | 3000 | Amount of secondary particles ≥71% |
| Example 3 | Non-needle green petroleum coke | 8.0 | 0.5 | 3100 | Amount of secondary particles ≥75% |
| Example 4 | Non-needle green petroleum coke | 9.8 | 2.0 | 3100 | Amount of secondary particlesk ≥80% |
| Example 5 | Non-needle green petroleum coke | 10.8 | 0.5 | 3100 | Amount of secondary particles ≥85% |
| Example 6 | Non-needle green petroleum coke | 11.5 | 1.0 | 3150 | Amount of secondary particles ≥90% |
| Example 7 | Non-needle green pitch coke | 12.0 | 1.5 | 3050 | Amount of secondary particles ≥78% |
| Comparative Example 1 | Needle-like cooked petroleum coke | 3.0 | 0.5 | 2950 | Amount of secondary particles ≥60% |
| Comparative Example 2 | Needle-like cooked petroleum coke | 3.0 | 0.5 | 2950 | Amount of primary particles ≥90% |

TABLE 1-2

Test results of Examples 1-7 and Comparative Examples 1-2

| | Artificial graphite | | | | Cyclic expansion rate of electrode plate [%] | Gram capacity of the artificial graphite [mAh/g] |
|---|---|---|---|---|---|---|
| | B/A | OI in electrode plate | Dn10 [μm] | Specific surface area [m²/g] | | |
| Example 1 | 0.85 | 12.0 | 0.80 | 1.35 | 30.5 | 351.1 |
| Example 2 | 0.86 | 11.3 | 0.85 | 1.25 | 29.5 | 351.4 |
| Example 3 | 0.92 | 10.0 | 0.98 | 1.13 | 28.0 | 353.3 |
| Example 4 | 0.88 | 11.0 | 0.89 | 1.25 | 29.0 | 352.5 |
| Example 5 | 0.89 | 10.5 | 0.92 | 1.20 | 28.8 | 352.9 |
| Example 6 | 0.91 | 9.8 | 0.98 | 1.15 | 28.0 | 353.1 |
| Example 7 | 0.95 | 14.0 | 1.15 | 1.10 | 28.9 | 340.5 |
| Comparative Example 1 | 0.81 | 20.5 | 2.30 | 1.15 | 37.4 | 353.5 |
| Comparative Example 2 | 0.93 | 22.2 | 0.70 | 1.65 | 38.3 | 352.7 |

Other parameters of the artificial graphite:

The $Dv_{50}$ of the artificial graphite of Examples 1-7 and Comparative Example 1 was about from 16 μm to 16.5 μm; and the $Dv_{50}$ of artificial graphite of Comparative Example 2 was about from 8.5 μm to 9 μm.

The $Dv_{10}$ of the artificial graphite of Examples 1-7 and Comparative Example 1 was about from 7.5 μm to 8.5 μm; and the $Dv_{10}$ of the artificial graphite of Comparative Example 2 was about from 4 μm to 4.5 μm.

The graphitization degree of the artificial graphite of Examples 1-6 and Comparative Examples 1-2 was from about 92% to about 93%; and the graphitization degree of the artificial graphite of Example 7 was from 90.5.

The $I_D/I_G$ of the artificial graphite of Examples 1-7 was 0.18, the $I_D/I_G$ of the artificial graphite of Comparative Example 1 was 0.23, and the $I_D/I_G$ of the artificial graphite of Comparative Example 2 was 0.16.

It can be seen from the results in Table 1-2 that the artificial graphite in the examples of the present application comprised secondary particles formed by agglomeration of primary particles, and a ratio B/A of the volume average size B of the artificial graphite after being compressed under a pressure of 2000 kg to the volume average particle size A of the artificial graphite was a 0.85. As a result, the artificial graphite had a higher bulk structure stability; the electrode plate had a low orientation index and a high degree of isotropy, and the negative electrode plate containing the same had a significantly reduced expansion rate during the cycle process. Thus, the cyclic expansion of the secondary battery may be reduced, and therefore the cycle life and safety performance of the battery may be improved.

However, the artificial graphite in Comparative Example 1 had a large change in the volume average particle size before and after powder compaction, indicating that its bulk structure stability was poor, resulting in a large expansion rate of the negative electrode plate during the cycle. Although the artificial graphite in Comparative Example 2 had a higher structural strength, it was mainly consisted of primary particles, and the negative electrode plate containing the same had a larger cyclic expansion rate.

Examples 8-12

The preparation method was similar to Example 4 with the exception that the step 2) of the preparation of artificial graphite further comprised the step of removing fine powder after shaping to adjust the Dn10 of artificial graphite.

TABLE 2

Test results of Examples 8-12

| | Artificial graphite | | | | Cyclic expansion rate of electrode plate [%] | Gram capacity of the artificial graphite [mAh/g] |
|---|---|---|---|---|---|---|
| | B/A | OI value | Dn10 [μm] | Specific surface area [m²/g] | | |
| Example 8 | 0.88 | 10.8 | 1.2 | 1.20 | 29.2 | 355.0 |
| Example 9 | 0.88 | 11.2 | 1.3 | 1.15 | 28.5 | 355.3 |
| Example 10 | 0.88 | 10.9 | 1.5 | 1.10 | 28.4 | 355.6 |
| Example 11 | 0.88 | 11.7 | 1.8 | 1.05 | 28.7 | 356.1 |
| Example 12 | 0.88 | 10.6 | 2.5 | 1.00 | 29.2 | 356.8 |

Other parameters of the artificial graphite of Examples 8-12:

The Dv50 was about from 16 μm to 16.5 μm; Dv10 was about from 7.5 μm to 8.5 μm; the degree of graphitization was about from 92% to 93%; and Id/Ig was about from 0.16 to 0.18.

From the comparison between Examples 8-12 and Example 4, it can be seen that when the artificial graphite further satisfies its Dn10 within an appropriate range, the gram capacity of the artificial graphite was further increased while improving the cyclic expansion of the electrode plate and the battery.

Examples 13-17

The preparation method was similar to Example 4 with the exception that the preparation parameters of the artificial graphite were adjusted to obtain artificial graphite having different particle sizes and specific surface area.

TABLE 3

Test results of Examples 13-17

| | Artificial graphite | | | | | Cyclic expansion rate of electrode plate [%] | Gram capacity of the artificial graphite [mAh/g] | Kinetic performance |
|---|---|---|---|---|---|---|---|---|
| | B/A | OI value | $D_n10$ [μm] | $D_v50$ [μm] | $D_v10$ [μm] | Specific surface area [m²/g] | | | |
| Ex. 13 | 0.88 | 11.8 | 0.89 | 12.2 | 6.1 | 1.25 | 28.9 | 348.7 | 1.7 C |
| Ex. 14 | 0.88 | 11.5 | 0.89 | 15.5 | 7.3 | 1.19 | 28.6 | 351.9 | 1.6 C |
| Ex. 15 | 0.88 | 10.5 | 0.89 | 17.3 | 8.9 | 1.15 | 28.5 | 352.4 | 1.5 C |
| Ex. 16 | 0.88 | 10.1 | 0.89 | 18.0 | 9.5 | 1.10 | 28.1 | 352.9 | 1.5 C |
| Ex. 17 | 0.88 | 8.7 | 0.89 | 22.0 | 11.5 | 0.80 | 28.0 | 355.8 | 1.4 C |

Other parameters of the artificial graphite of Examples 13-17:

The degree of graphitization was about from 92% to 93%; and Id/Ig was about from 0.16 to 0.18.

From the comparison between Examples 13-17 and Example 4, it can be seen that when the artificial graphite further satisfied its Dv50, Dv10 and SSA within an appropriate range, the electrode plate and the battery had a lower cyclic expansion while the artificial graphite had a higher gram capacity. Especially, when the artificial graphite further satisfied its Dv50, Dv10 and SSA within an appropriate range, the kinetic performance of batteries was improved.

Example 18

The preparation method was similar to Example 4 with the exception that the temperature of graphitization was 3200° C.

TABLE 4

Test results of Example 18

| | Artificial graphite | | | | Cyclic expansion rate of electrode plate [%] | Gram capacity of the artificial graphite [mAh/g] |
|---|---|---|---|---|---|---|
| | B/A | OI Value | $D_n10$ [μm] | graphitization [%] | Specific surface area [m²/g] | | |
| Ex. 18 | 0.85 | 11.0 | 0.89 | 94.5 | 1.25 | 31 | 357 |

Other parameters of the artificial graphite of Example 18:
The Dv50 was about from 16 μm to 16.5 μm; Dv10 was about from 7.5 μm to 8.5 μm; and Id/Ig was about 0.18.

From the comparison between Example 18 and Example 4, it can be seen that when the artificial graphite further satisfied its graphitization within an appropriate range, the electrode plate and the battery had a lower cyclic expansion while the artificial graphite had a higher gram capacity.

Example 19

The preparation method was similar to Example 14 with the exception that after step (4), it also comprises step (5): mixing the artificial graphite obtained in step (4) with asphalt and then carrying out a heat-treatment at a temperature of 1100° C. to obtain the artificial graphite with a coating layer.

TABLE 5

Test results of Example 19

| | | Artificial graphite | | | | Cyclic expansion rate of electrode plate [%] | Gmm capacity of the artificial graphite [mAh/g] | Kinetic performance |
|---|---|---|---|---|---|---|---|---|
| | B/A | OI Value | $D_n10$ [μm] | $D_v50$ [μm] | $D_v10$ [μm] | Specific surface area [m²/g] | | | |
| Ex. 19 | 0.90 | 10.8 | 2.1 | 16.3 | 7.8 | 1.02 | 30.5 | 350.2 | 1.8 C |

From the comparison between Example 19 and Example 14, it can be seen that when the artificial graphite of the present application further comprised an amorphous carbon on its surface, the dynamic performance of the artificial graphite can be improved under the premise that the cyclic expansion of the electrode plate and the gram capacity of the material were not greatly deteriorated.

Some exemplary embodiments of the present invention are provided as follows.

Embodiment 1. An artificial graphite comprising secondary particles formed by agglomeration of primary particles, the artificial graphite having a volume average particle size Dv50 denoted as A, and the artificial graphite through powder compaction under a pressure of 2000 kg having a volume average particle size Dv50 denoted as B, wherein A and B satisfy: B/A≥0.85.

Embodiment 2. The artificial graphite according to Embodiment 1, wherein A and B satisfy: B/A≥0.88; preferably, A and B satisfy: 0.88≤B/A≤0.92.

Embodiment 3. The artificial graphite according to Embodiment 1 or 2, wherein when the artificial graphite is present in an electrode plate with a compaction density of from 1.6 g/cm³ to 1.7 g/cm³, a ratio of a peak area of 004 crystal plane to a peak area of 110 crystal plane of the artificial graphite is from 6 to 15, preferably from 8 to 12.

Embodiment 4. The artificial graphite according to any one of Embodiments 1 to 3, wherein the secondary particles have one or more of a block shape, a spherical shape, and a spheroid shape.

Embodiment 5. The artificial graphite according to any one of Embodiments 1 to 4, wherein the artificial graphite has a number particle size distribution Dn10 satisfying: Dn10 1 μm; preferably, 1.2 μm≤Dn10≤3 μm.

Embodiment 6. The artificial graphite according to any one of Embodiments 1 to 5, wherein the artificial graphite has a graphitization degree of from 90% to 95%, preferably from 92% to 94%.

Embodiment 7. The artificial graphite according to any one of Embodiments 1 to 6, wherein a peak D intensity $I_D$ and a peak G intensity $I_G$ of the artificial graphite satisfy: $I_D/I_G$≤0.25, preferably, 0.1≤$I_D/I_G$≤0.2.

Embodiment 8. The artificial graphite according to any one of Embodiments 1 to 7, wherein the artificial graphite also satisfies one or more of the following (1)-(4):

(1) the artificial graphite has a volume average particle size Dv50 of from 12 μm to 22 μm, preferably from 15 μm to 18 μm;

(2) the artificial graphite has a volume particle size distribution Dv10 of Dv10≥6 μm, preferably 6.5 μm≤Dv10≤10.5 μm;

(3) the artificial graphite ha a particle size distribution (Dv90−Dv10)/Dv50 of from 1.1 to 1.8, preferably from 1.2 to 1.5;

(4) the artificial graphite ha a specific surface area SSA of from 0.5 m²/g to 2.0 m²/g, preferably from 0.8 m²/g to 1.5 m²/g.

Embodiment 9. The artificial graphite according to any one of Embodiments 1 to 8, wherein:
the artificial graphite has a tap density of from 0.85 g/cm³ to 1.35 g/cm³, preferably from 0.95 g/cm³ to 1.15 g/cm³; and/or,
the artificial graphite has a powder compaction density under a pressure of 2000 kg of from 1.65 g/cm³ to 1.85 g/cm³, preferably from 1.68 g/cm³ to 1.83 g/cm³.

Embodiment 10. The artificial graphite according to Embodiment 1, wherein the secondary particles has a number proportion in the artificial graphite of ≥60%, preferably 70%-90%.

Embodiment 11. The artificial graphite according to any one of Embodiments 1 to 10, wherein the artificial graphite has a gram capacity of from 350 mAh/g to 359 mAh/g, preferably from 352 mAh/g to 355 mAh/g.

Embodiment 12. The artificial graphite according to any one of Embodiments 1 to 11, wherein the artificial graphite has an amorphous carbon coating layer on at least a part of the surface thereof.

Embodiment 13. A secondary battery comprising a negative electrode plate, the negative electrode plate comprises a negative active material, and the negative active material comprises the artificial graphite according to any one of Embodiments 1 to 12.

Embodiment 14. An apparatus comprising the secondary battery according to Embodiment 13.

Embodiment 15. A method for preparing an artificial graphite, including the following steps:
(1) crushing green coke materials and classifying them to remove fine powder so as to obtain a precursor;
(2) shaping the precursor crushed in step (1);

(3) granulating the precursor treated in step (2) during which a binder is added in an amount not exceed 5% of the total weight of the green coke materials;

(4) subjecting the product obtained in step (3) to a graphitization treatment at a temperature of from 2800° C. to 3200° C. to obtain the artificial graphite;

wherein the artificial graphite comprises secondary particles formed by agglomeration of primary particles, the artificial graphite has a volume average particle size Dv50, denoted as A, the artificial graphite through powder compaction under a pressure of 2000 kg has a volume average particle size Dv50, denoted as B, and a relationship between A and B satisfies: B/A≥0.85.

Embodiment 16. The preparation method according to Embodiment 15, wherein the green coke material comprises one or more of green petroleum coke, green pitch coke and metallurgical coke; preferably, the green coke material comprises green petroleum coke.

Embodiment 17. The preparation method according to Embodiment 15 or 16, wherein the green coke material is non-needle coke.

Embodiment 18. The preparation method according to any one of Embodiments 15 to 17, wherein the green coke material has a volatile content of from 6% to 12%, preferably from 7% to 10%; and/or, the green coke material has a sulfur content of ≤2%, preferably ≤0.6%.

Embodiment 19. The preparation method according to Embodiment 15, wherein the step (2) further comprises removing fine powder after shaping; preferably, the precursor treated in step (2) through a fine powder removal treatment has a number particle size $D_n10$ that is controlled to be ≥0.5 μm, preferably from 0.5 μm to 1.5 μm.

Embodiment 20. The preparation method according to Embodiment 15, wherein the granulating step is carried out without adding a binder.

Embodiment 21. The preparation method according to any one of Embodiments 15 to 20, wherein the product obtained in step (3) is graphitized at a temperature of from 2900° C. to 3100° C.

Embodiment 22. The preparation method according to any one of Embodiments 15 to 21, further comprising a step (5) of mixing the artificial graphite obtained in step (4) with an organic carbon source to obtain a mixture and heat treating the mixture at a temperature of from 850° C. to 1250° C.

Embodiment 23. A method for preparing a secondary battery, comprising the step of preparing a negative electrode plate by using the artificial graphite according to any one of Embodiments 1 to 12.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. An artificial graphite comprising secondary particles formed by agglomeration of primary particles, the artificial graphite having a volume average particle size Dv50 denoted as A, and the artificial graphite through powder compaction under a pressure of 19600N/1.327 cm² having a volume average particle size Dv50 denoted as B, wherein A and B satisfy: 0.85≤B/A≤0.92, the artificial graphite has a volume average particle size Dv50 of from 15 μm to 18 μm.

2. The artificial graphite according to claim 1, wherein A and B satisfy: 0.88≤B/A≤0.92.

3. The artificial graphite according to claim 1, wherein when the artificial graphite is present in an electrode plate with a compaction density of from 1.6 g/cm³ to 1.7 g/cm³, a ratio of a peak area of 004 crystal plane to a peak area of 110 crystal plane of the artificial graphite is from 8 to 12.

4. The artificial graphite according to claim 1, wherein the secondary particles have one or more of a block shape, a spherical shape, and a spheroid shape.

5. The artificial graphite according to claim 1, wherein the artificial graphite has a number particle size distribution Dn10 satisfying 1.2 μm≤Dn10≤3 μm.

6. The artificial graphite according to claim 1, wherein the artificial graphite has a graphitization degree of from 90% to 95%.

7. The artificial graphite according to claim 1, wherein a peak D intensity ID and a peak G intensity IG of the artificial graphite satisfy: $0.1 \leq I_D/I_G \leq 0.2$.

8. The artificial graphite according to claim 1, wherein the artificial graphite further satisfies one or more of the following (1)-(3):
(1) the artificial graphite has a volume particle size distribution Dv10 of Dv10≤6 μm;
(2) the artificial graphite ha a particle size distribution (Dv90-Dv10)/Dv50 of from 1.1 to 1.8;
(3) the artificial graphite ha a specific surface area SSA of from 0.5 m²/g to 2.0 m²/g.

9. The artificial graphite according to claim 8, wherein the artificial graphite further satisfies one or more of the following (1)-(3):
(1) the artificial graphite has a volume particle size distribution Dv10 of 6.5 μm≤Dv10 ≤10.5 μm;
(2) the artificial graphite has a particle size distribution (Dv90-Dv10)/Dv50 of from 1.2 to 1.5;
(3) the artificial graphite has a specific surface area SSA of from 0.8 m²/g to 1.5 m²/g.

10. The artificial graphite according to claim 1, wherein the artificial graphite has a tap density of from 0.85 g/cm³ to 1.35 g/cm³; and/or,
the artificial graphite has a powder compaction density under a pressure of 2000 kgf of from 1.65 g/cm³ to 1.85 g/cm³.

11. The artificial graphite according to claim 10, wherein the artificial graphite has a tap density of from 0.95 g/cm³ to 1.15 g/cm³; and/or,
the artificial graphite has a powder compaction density under a pressure of 2000 kgf of from 1.68 g/cm³ to 1.83 g/cm³.

12. The artificial graphite according to claim 1, wherein the secondary particles has a number proportion in the artificial graphite of ≥60%.

13. The artificial graphite according to claim 1, wherein the artificial graphite has a gram capacity of from 350 mAh/g to 359 mAh/g.

14. The artificial graphite according to claim 1, wherein the artificial graphite has an amorphous carbon coating layer on at least a part of the surface thereof.

15. A secondary battery comprising a negative electrode plate, the negative electrode plate comprises a negative active material, and the negative active material comprises the artificial graphite according to claim 1.

16. A method for preparing an artificial graphite, including the following steps:

(1) crushing green coke materials and classifying them to remove fine powder so as to obtain a precursor;

(2) shaping the precursor crushed in step (1);

(3) granulating the precursor treated in step (2) during which a binder is added in an amount not exceed 5% of the total weight of the green coke materials;

(4) subjecting the product obtained in step (3) to a graphitization treatment at a temperature of from 2800° C. to 3200° ° C. to obtain the artificial graphite;

wherein the artificial graphite comprises secondary particles formed by agglomeration of primary particles, the artificial graphite has a volume average particle size Dv50, denoted as A, the artificial graphite through powder compaction under a pressure of 19600N/1.327 cm$^2$ has a volume average particle size Dv50, denoted as B, and A and B satisfy: $0.85 \leq B/A \leq 0.92$, the artificial graphite has a volume average particle size Dv50 of from 15 μm to 18 μm.

17. The preparation method according to claim 16, wherein the green coke material comprises one or more of green petroleum coke, green pitch coke and metallurgical coke.

18. The preparation method according to claim 16, wherein the green coke material is non-needle coke; and/or, the green coke material has a volatile content of from 6% to 12%; and/or, the green coke material has a sulfur content of ≤2%.

19. The preparation method according to claim 16, wherein the step (2) further comprises removing fine powder after shaping; the precursor treated in step (2) through a fine powder removal treatment has a number particle size $D_n10$ that is controlled to be ≥0.5 μm.

20. The preparation method according to claim 16, further comprising a step (5) of mixing the artificial graphite obtained in step (4) with an organic carbon source to obtain a mixture and heat treating the mixture at a temperature of from 850° C. to 1250° C.

* * * * *